United States Patent [19]
Neuman et al.

[11] Patent Number: 5,679,315
[45] Date of Patent: Oct. 21, 1997

[54] METHOD OF PRODUCTION OF HIGH PURITY SILICA

[75] Inventors: Daniel C. Neuman, Soda Springs; Clint R. Humpherys, Paris, both of Id.

[73] Assignee: Nu-West Industries, Inc., Soda Springs, Id.

[21] Appl. No.: 533,321

[22] Filed: Sep. 25, 1995

[51] Int. Cl.$^6$ .................................................. C01B 33/12
[52] U.S. Cl. .................. 423/339; 423/470; 423/471; 423/319; 423/320; 423/157.2; 423/157.3; 423/157.4
[58] Field of Search ........................ 423/339, 470, 423/471, 319, 320, 157.2, 157.3, 157.4

[56] References Cited

U.S. PATENT DOCUMENTS

| | | | |
|---|---|---|---|
| 3,021,194 | 2/1962 | Cunningham | 23/88 |
| 3,271,107 | 9/1966 | Nickerson et al. | 23/182 |
| 3,459,522 | 8/1969 | Elmer et al. | 65/30 |
| 3,966,877 | 6/1976 | Kalach et al. | 423/240 |
| 4,026,997 | 5/1977 | Schneider et al. | 423/470 |
| 4,465,657 | 8/1984 | Spijker | 423/339 |
| 4,981,664 | 1/1991 | Chieng | 425/339 |
| 5,004,488 | 4/1991 | Mehrotra | 65/18.2 |
| 5,028,407 | 7/1991 | Chieng et al. | 423/338 |
| 5,030,433 | 7/1991 | Mehrotra | 423/335 |
| 5,165,907 | 11/1992 | Chieng | 423/339 |
| 5,266,289 | 11/1993 | Tsugeno et al. | 423/339 |
| 5,458,864 | 10/1995 | Tsugeno et al. | 423/339 |

FOREIGN PATENT DOCUMENTS 0 638 516 A1   7/1994   Germany.

Primary Examiner—Deborah Jones
Assistant Examiner—Amy M. Harding
Attorney, Agent, or Firm—Trask, Britt & Rossa

[57] ABSTRACT

The present invention provides a basic method for producing high purity silica and ammonium fluoride from silicon tetrafluoride-containing gas, particularly the gas generated by acidulation. The basic method comprises recovering silicon tetrafluoride-containing gas from the acidulation of a fluorine-containing phosphorus source, separating liquid entrainment from the gas, converting the gas recovered to an ammonium fluosilicate solution, and ammoniating said ammonium fluosilicate solution to produce high purity silica and ammonium fluoride. The present invention goes beyond this basic method with an improved stripper design for removing impure silicon tetrafluoride from the wet phosphoric acid process, the use of demisting equipment on the anhydrous ammonia vaporizer to reduce contamination in the gas stream, the use of ion-exchange to remove impurities from the ammonium fluosilicate or fluosilicic acid solutions, seeding an ammonium fluosilicate/ammonia reactor with silica crystals to permit continuous reactor operation, and the operation of an ammonium fluoride evaporator in a manner to reduce the N/F mole ratio below about 1 which prevents premature precipitation of silica when the ammonium fluoride is introduced in an absorber.

16 Claims, 2 Drawing Sheets

METHOD OF PRODUCTION OF HIGH PURITY SILICA

FIELD OF THE INVENTION

The present invention relates generally to an apparatus for producing high purity silica, and more particularly to a method of recovering high purity silica from an impure fluoride-containing source.

BACKGROUND OF THE INVENTION

Phosphate-containing fertilizers and phosphoric acid are produced by reacting phosphate-containing rock with an acid, such as sulfuric acid, by the following reaction:

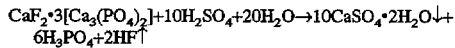
$$CaF_2 \cdot 3[Ca_3(PO_4)_2] + 10H_2SO_4 + 20H_2O \rightarrow 10CaSO_4 \cdot 2H_2O\downarrow + 6H_3PO_4 + 2HF\uparrow$$

However, since a substantial mount of silica ($SiO_2$) and fluorine exists in the raw phosphorus-containing rock, the following collateral reaction also occurs:

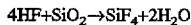
$$4HF + SiO_2 \rightarrow SiF_4 + 2H_2O$$

Thus, gaseous silicon tetrafluoride ($SiF_4$) is produced as an undesired by-product.

The noxious nature of silicon tetrafluoride necessitates its removal prior to exhausting the gas to atmosphere. Therefore, the gas stream is generally passed through water absorption vessels or venturi scrubbers. Absorption of silicon tetrafluoride in water yields aqueous fluosilicic acid and silica precipitate by the following reaction:

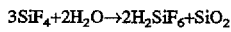
$$3SiF_4 + 2H_2O \rightarrow 2H_2SiF_6 + SiO_2$$

Silica has a number of commercial uses, but presently the most valuable use is in the production of integrated circuits and optics. However, the silica used in the production of integrated circuits and optics must be of an extremely high purity. For example, the silica used in very large scale integrated (VLSI) microchip applications must have a very low concentration of certain radioactive elements. For example, uranium and thorium concentrations must be less than 1 part per billion (ppb). The maximum acceptable level of ionic impurities, including cations such as aluminum, boron, calcium, cobalt, chromium, copper, iron, potassium, and zinc, and anions containing phosphorus and sulfur, also is less than 10 parts per million (ppm), and often is preferably below 1 part per million or even less. High purity silica is also used in composites, advanced ceramics, laser optics, and fiber optics.

Present processes for recovering silica ("synthetic silica") from processes such as the absorption of silicon tetrafluoride in water do not produce a product with high enough purity to satisfy the low contamination requirements of these silica applications. Therefore, high purity silica is presently supplied from natural silica sources such as quartz.

Furthermore, commercially available synthetic silica is generally very light, fluffy, free and usually not suitable for making fused quartz products. Optical elements made from silica must be free of bubbles, color centers, and elements which can absorb radiation in undesired regions of the wavelength spectrum. The uses of high purity silica require that the silica particles to be fused must have a relatively high density. If the density is too low, air trapped within the pore structure forms bubbles upon heating the silica particles. These bubbles do not escape due to the high viscosity of the molten glass. Since high density silica reduces or eliminates bubble formation, there is a need to make dense, high purity, synthetic silica particles.

U.S. Pat. No. 5,165,907 ("the '907 patent") discloses a method for producing high purity silica and ammonium fluoride from silicon tetrafluoride-containing gas, particularly the gas generated by acidulation of weak phosphoric acid for the gypsum filtration step of the wet phosphoric acid process. This patent discloses that high purity silica and ammonium fluoride can be produced from this source of impure silicon tetrafluoride-containing gas by minimizing the entrained liquid in the gas by conventional liquid separation means, such as impingement (e.g. cyclonic separation, tortuous path filters, and electrostatic separators, are suggested for this purpose). Liquid entrainment was identified as a significant source of impurities.

In one embodiment of the '907 patent, after minimizing the liquid entrainment, the silicon tetrafluoride in the gas is hydrolyzed by absorption in water to produce a silica and fluosilicic acid solution. The silica is separated from the fluosilicic acid solution. The solution is then reacted with ammonium fluoride or ammonia to produce pure ammonium fluosilicate and silica which is separated out. The ammonium fluosilicate is then chilled to separate ammonium fluosilicate crystals from the solution. The ammonium fluosilicate crystals are then, in a preferred embodiment, recrystallized for higher purity. The ammonium fluosilicate crystals are then reacted with ammonia to produce high purity silica and high purity ammonium fluoride. This method is complex with a significant number of production steps to produce the high purity silica.

In an alternative embodiment, the cleaned gaseous silicon tetrafluoride is absorbed in an aqueous ammonium fluoride solution to produce ammonium fluosilicate solution directly. The ammonium fluosilicate is then purified and reacted with ammonia to form high purity silica and high purity ammonium fluoride as described above. Although this embodiment is simpler, the '907 patent (col. 7, lines 20–32) indicates that the products from this embodiment are not as pure as those produced in the first embodiment with the proviso that "[t]hose skilled in the art can resolve the economic balance of yield and product purity against the cost of utilizing subsequent purification steps."

A typical technique according to the '907 patent for obtaining silica is set forth in Example 3, which, in summation, shows the crystallization of a 1250 kg sample of 25% ammonium fluosilicate solution. This 25% solution would contain approximately 312.5 kg of ammonium fluosilicate. However, the crystallization in Example 3 only recovered 150 kg of ammonium fluosilicate crystals, leaving 162.5 kg of ammonium fluosilicate in solution. The 150 kg of ammonium fluosilicate was ammoniated, which yielded 45 kg of high purity silica and 460 kg of high purity ammonium fluoride.

In an attempt to recover more silica, the mother liquor was ammoniated. However, this yielded a silica of much lower purity, according to the information presented in Table 3 of the '907 patent.

The purity of silica from crystallization compared favorably with the comparative sample (Table 1) with an Fe content of 0.26 ppm and 0.3 ppm, respectively, while silica from the mother liquor had a purity of about 2.22 ppm. However, the current standards for purity of silica to be used in the electronic industry are even more stringent than those which existed at the time of the filing of the application from which the '907 patent issued. Furthermore, unless a higher purity silica from the mother liquor is recovered, the total yield of pure silica is undesirably low.

Therefore, it would be advantageous to design a method of producing high purity silica which is less complex yet achieves greater silica purity and yield than previous designs, as well as producing a silica having good fusibility characteristics.

SUMMARY OF THE INVENTION

The present invention provides a basic improved method for producing high purity silica and ammonium fluoride from silicon tetrafluoride-containing gas, particularly the gas generated by acidulation, for example with concentrated sulfuric acid, of phosphoric acid from the gypsum filtration step of a wet phosphoric acid process of the type discussed in the '907 patent, wherein the method comprises:

a. recovering silicon tetrafluoride-containing gas from the acidulation of a fluorine-containing phosphorus source;

b. separating liquid entrainment from the gas;

c. converting the gas recovered from step (b) to an ammonium fluosilicate solution; and d. ammoniating said ammonium fluosilicate solution to produce high purity silica and ammonium fluoride.

However, the present invention goes beyond this basic method with novel process improvements to achieve greater efficiency, higher yields, and simpler production steps. These novel improvements include an improved stripper design for removing impure silicon tetrafluoride from the wet phosphoric acid process, the use of demisting equipment on the anhydrous ammonia vaporizer to reduce contamination in the gas stream, the use of ion-exchange to remove impurities from the ammonium fluosilicate or fluosilicic acid solutions, seeding an ammonium fluosilicate/ammonia reactor with silica crystals to enhance continuous reactor operation, and the operation of an ammonium fluoride evaporator in a manner to reduce the N/F mole ratio below about 1 which prevents premature precipitation of silica when the ammonium fluoride is introduced in an absorber.

The improved stripper design eliminates problems in removing impure silicon tetrafluoride from the wet phosphoric acid process, namely the material compatibility, vessel life, and the precipitation of hemihydrates which causes scaling. The high temperatures in present stripper designs primarily cause these problems (high sulfuric acid concentration also contributes to scaling). The present invention provides a new stripper design similar to a vacuum cooler which operates at lower temperatures and lower sulfuric acid concentrations in order to generate silicon tetrafluoride gas without generating hemihydrate. Although silica stripping efficiencies for such a vessel may be lower than present designs, such stripping efficiencies may be improved by sparging live steam into the liquid within the vessel; however, this may tend to increase undesirable overhead liquid entrainment. Furthermore, since it has been found that minimization of mist entrained compounds is very important to the ultimate purity of the silica, the new stripper design introduces both the sulfuric acid and the phosphoric acid below the liquid (acid) level in the stripper.

Additionally, it has also been found to be desirable to use demisting equipment on the vaporizer in the anhydrous ammonia gas stream to reduce contamination derived from liquid ammonia entrainment. Anhydrous ammonia is generally manufactured in mild steel compressors and is often contaminated with metal containing lubricants. Therefore, it is very desirable that ammonia droplets, which carry the majority of the contaminants, be removed from the ammonia vapor before entering the process. The present invention provides, in one embodiment, a vaporizer comprised of a vertical, single pass, shell and tube exchanger with steam in the shell and ammonia in the tubes. A vapor drum is mounted above the exchanger and a liquid level is maintained in the drum at all times. This design forces a liquid/vapor mixture to rise through a pool of liquid ammonia in the drum, thereby, minimizing liquid entrainment in the vapor stream leaving the vaporizer. The operating temperatures and pressures of the vapor drum are preferably between about 32° F. to 65° F. (most preferably about 40° F.) and between about 50 psig to 100 psig (most preferably about 60 psig), respectively.

A potentially more favorable design for the demisting equipment on the vaporizer would be a kettle or pool type reboiler/vaporizer with tubes submerged horizontally and a liquid with disengaging zone above.

The present invention also provides for the seeding of an ammonium fluosilicate/ammonia reactor with silica crystals which allows for the continuous production of silica which fuses relatively bubble free after thermal treatment. Applicant has found that silica seed crystals are especially desirable since spontaneous nucleation of new silica particles within the reactor at alkaline pH produces silica which does not fuse well after thermal treatment. In one embodiment, the present invention provides a batch seed reactor consisting of a tank of ammonium fluosilicate which is ammoniated batch-wise to precipitate an acceptable seed silica. This silica is fed continuously to a continuous reactor to act as seed crystals for the precipitation of the synthetic silica.

The present invention further provides for the operation of an ammonium fluoride evaporator to reduce the N/F mole ratio of ammonium fluoride stream below about 1. Applicant has found that a reduction of the N/F mole ratio below about 1 prevents premature precipitation of silica when the ammonium fluoride is introduced in an absorber. The reduced mole ratio of the feed to the absorber is advantageous because premature precipitation can have adverse effects on the fusibility of the product silica if it is not removed prior to decomposition of the ammonium fluosilicate. Prematurely precipitated silica also hinders transport of the ammonium fluosilicate by causing damage and wear to pumps.

BRIEF DESCRIPTION OF THE DRAWINGS

While the specification concludes with claims particularly pointing out and distinctly claiming that which is regarded as the present invention, the objects and advantages of this invention can be more readily ascertained from the following description of the invention when read in conjunction with the accompanying drawings in which:

DETAILED DESCRIPTION OF THE INVENTION

The present invention relates to a method of producing high purity silica and ammonium fluoride from impure silicon tetrafluoride-containing gas, particularly the gas generated by acidulation, for example, with concentrated sulfuric acid, of weak phosphoric acid from the gypsum filtration step of a wet phosphoric acid process.

Figure 1:
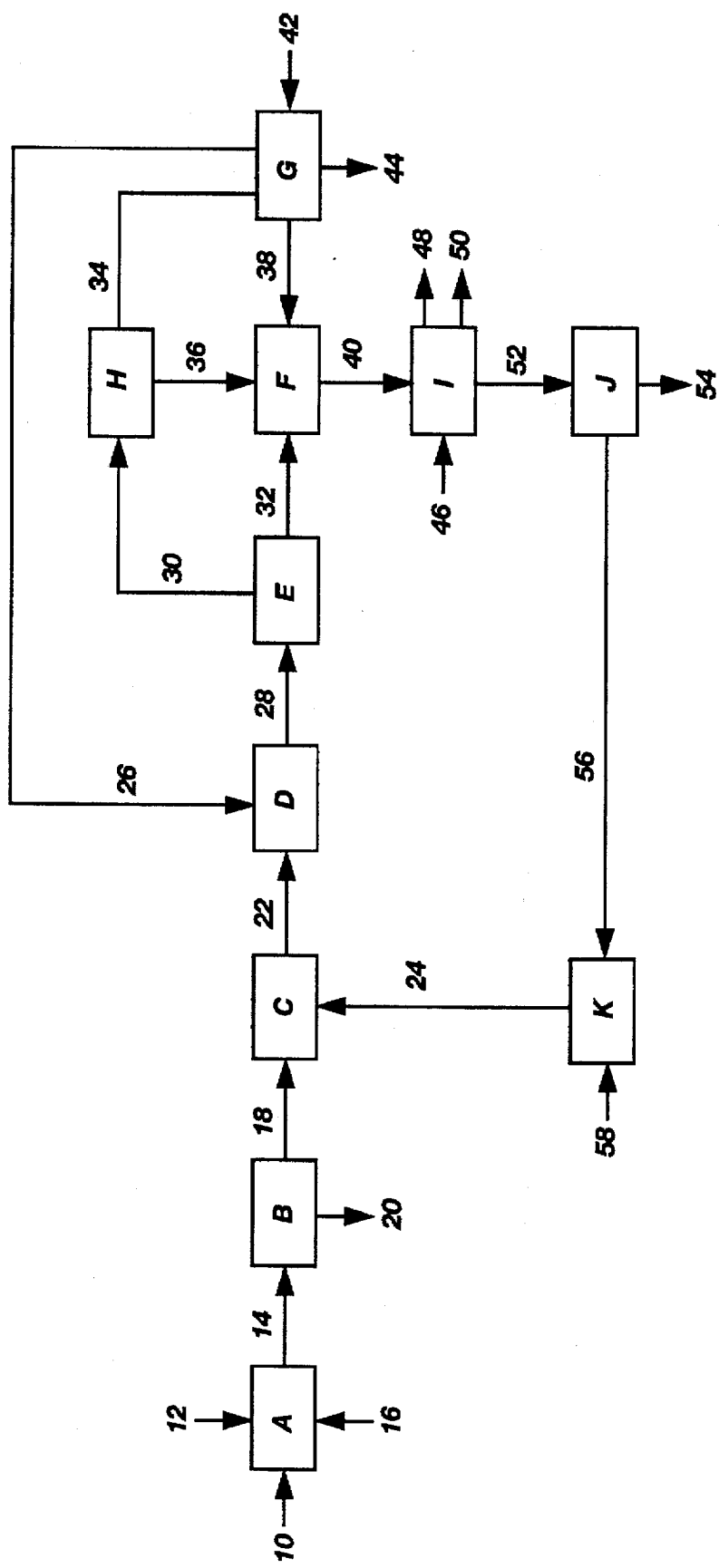
FIG. 1 is a schematic diagram of the process of the present invention.

FIG. 1 shows a schematic of the present invention wherein sulfuric acid 10 and phosphoric acid 12 (i.e. from the gypsum filtration step of the wet phosphoric acid process) are combined in a stripper A wherein an impure silicon tetrafluoride gas stream 14 is liberated from an outlet stream 16.

In a preferred embodiment, a mixture of about 93% sulfuric acid with about 18% $P_2O_5$ phosphoric acid in a volume ratio of less than about 2.25:1, preferably 1.5:1, are introduced into the stripper A at atmospheric pressure (slight negative draft) to generate silicon tetrafluoride gas. However, with present vessel design, excessive temperatures have caused significant problems in terms of material compatibility and vessel life. Another significant problem has been scaling. Two factors contribute to the scaling problem. First, virtually all soluble calcium becomes insoluble at elevated sulfuric acid concentrations (above about 45% $H_2SO_4$). Second, not only are existing dihydrate gypsum solids convened to "sticky" hemihydrate, but calcium which precipitates also does so as hemihydrate. These hemihydrate crystals are typically difficult to filter. Therefore, the present invention includes a design which addresses these factors to eliminate these problems.

It has been found that a vessel similar to a vacuum cooler can be operated at lower temperatures and lower surf uric acid concentrations in order to generate silicon tetrafluoride gas without generating hemihydrate. Unfortunately, silica stripping efficiencies for such a vessel tends to drop from greater than 90% to about 70%. However, these stripping efficiencies may be improved by sparging live steam into the liquid within the vessel. Furthermore, the reduction in operating temperatures of the stripper A allows construction materials to be more conventional, such as brick-lined, rubber-lined, mild steel, or the like.

Since it has been found that minimization of mist entrained compounds is very important to the ultimate purity of the silica, the stripper A should have both the sulfuric acid 10 and the phosphoric acid 12 introduced below the liquid level in the stripper A. This modification generates less mist entrainment in the overhead silicon tetrafluoride containing gas because the violent splashing action of the current mixing method is eliminated.

Figure 2:
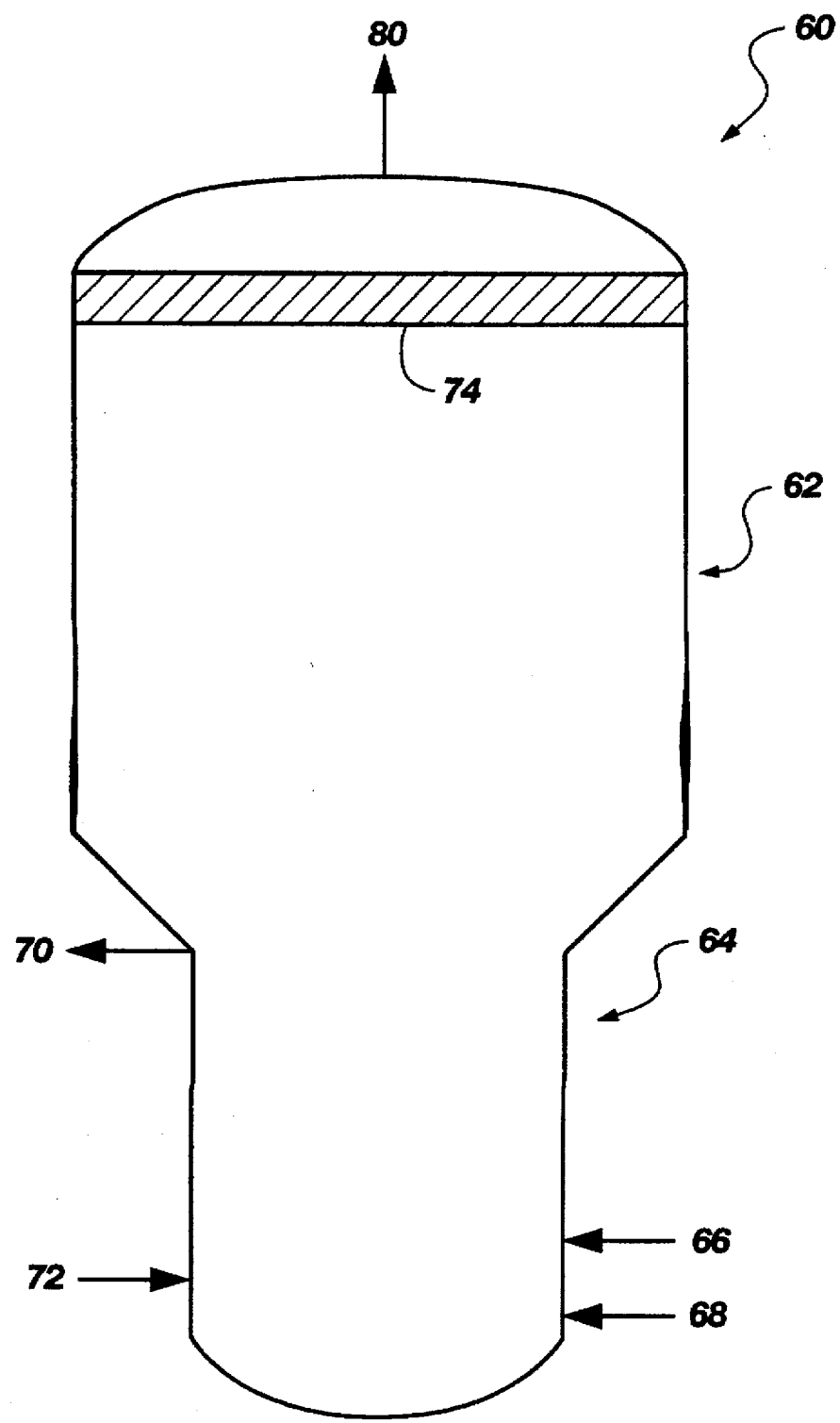
FIG. 2 is a schematic diagram of the improved stripper of the present invention.

FIG. 2 shows a preferred stripper design. The stripper 60 consists of a vessel 62 (about 48 inches in diameter) having a neck 64 (about 30 inches in diameter) attached to and extending downward from said vessel 62. The neck 64 is designed to receive a phosphoric acid (about 20% $P_2O_5$) stream 66 at about 60 gallons per minute and a sulfuric acid (about 93%) stream 68 at about 15 gallons per minute. The neck 64 suspends solids in the acid as the acid rises wherein the solids exit via an overflow line 70 which is positioned near the attachment of the vessel 62 and the neck 64. Above the neck 64, the vessel 62 increases in diameter to reduce vapor velocity, thereby allowing liquid droplets to fall back into to acid in the neck 64. The operating temperature and pressure of the stripper 60 is preferably about 160° F. and about 2.5 psia, respectively. After passing through a chevron type demister 74, impure silicon tetrafluoride stream 80 exits from the top of the vessel 62.

Silica stripping efficiencies of this design are between about 65–75%. This efficiency can be increased by sparging a steam stream 72 through the acid in the neck 64. The steam stream 72 provides a source of vapor with no partial pressure of silicon tetrafluoride gas which provides a higher mass transfer driving force for the liberation of silicon tetrafluoride gas. The overall operating temperature of the stripper 60 could be maintained at about 160° F. through a condenser (not shown) connected to an absorber C (discussed below) for the condensation of vapors exiting from said absorber C.

Increasing the flow of a condenser water stream to the condenser compensates for the increased thermal load on the condenser due to the latent heat of the steam. In other words, a higher flow of condenser water stream must be used in the condenser in order to maintain the same exit water stream temperature for the condenser and, hence, the same operating pressure (vacuum) in the stripper 60. It is understood that other known methods of controlling the overall temperature of the stripper 60 can be used, such as using a heat exchanger in lieu of the chevron type demister 74.

The use of stream sparging may have detrimental effects on liquid entrainment by both increasing the quantity of and decreasing the size of liquid splashed above the neck 64. The detrimental effects on liquid entrainment from steam sparging could be compensated for through the use of a larger vessel 62, the use of a larger chevron type demister 74, and/or the use of a hydroscopic filter which does not react with silicon tetrafluoride or hydrofluoric acid. However, stream sparging is optional since stripping efficiency is generally not a major concern because abundant silica is available in the wet process phosphoric acid.

Referring again to FIG. 1, the impure silicon tetrafluoride gas stream 14 is fed to a silicon tetrafluoride filter B which demists and thereby purifies the impure silicon tetrafluoride gas stream 14 to produce a cleaned silicon tetrafluoride gas stream 18 and a liquid impurities stream 20. The filter B can be an impingement falter, a sub-micron type filter, or the like.

The filter B may be used in conjunction with an ion exchange media whereby a contaminant cation is removed from ammonium fluosilicate liquid or fluosilicic acid stream and replaced by a proton. The ion exchange device may also be used to replace the impingement or sub-micron filter. Typical ion exchange media for this purpose include either gel-type or macroporous polystyrene divinylbenzene copolymer with an amino phosphonic functional group such as Rohm and Haas Duolite C-467™ (available from Rohm and Haas, Pittsburgh, Pa.), or Dow-X 650C™ or Dow-X XUS40406™ (available from Dow Chemical Company, Midland, Mich.).

A major contaminant of high purity silica is iron, although other cationic impurities common in phosphoric acid such as magnesium, calcium, sodium, zinc, titanium, and aluminum are also problematical. In production, iron contamination levels in the high purity silica product are steady between about 0.25 ppm and 0.50 ppm. After eliminating possible sources of iron contamination, impurity mass balances were performed on the contaminants leaving the plant with the high purity silica and the by-product ammonium fluoride. These impurity mass balances showed that the contamination was predominantly coming from liquid acid entrainment which remains in the silicon tetrafluoride gas stream after demisting with impingement or mesh type demisters. Since such mechanical demisting is not 100% efficient, it follows that some acid mist is passing through the unit and entering the ammonium fluosilicate solution in the absorber. Sub-micron demisting and ion exchange removal of impurities before the absorber are an effective manner of further reducing impurities in the final product.

Referring again to FIG. 1, the cleaned silicon tetrafluoride gas stream 18 is fed to the absorber C. A low N/F mole ratio 6% ammonium fluoride solution 24 is also introduced to the absorber C. The reaction of the cleaned silicon tetrafluoride gas stream 18 and the low N/F mole ratio 6% ammonium fluoride solution 24 produces an ammonium fluosilicate solution stream 22 by the following reaction:

$$SiF_4 + 2NH_4F \rightarrow (NH_4)_2SiF_6$$

The ammonium fluosilicate solution stream 22 has its pH adjusted to about 5 by sparging a first clean ammonia stream 26 in a mixer D to form a pH adjusted ammonium fluosilicate solution stream 28. The pH adjusted ammonium fluosilicate solution stream 28 is fed to ion exchange unit E for removal of trace amounts of impurities such as iron, zinc, titanium, copper, nickel, and the like. In a preferred embodiment, the ion exchange unit E has a resin bed about 30 inches in diameter and about 60 inches high which can accommodate approximately 10 gallons per minute of ammonium fluosilicate solution. The resin material is preferably a gel-type or macroporous polystyrene divinylbenzene copolymer with an amino-phosphonic functional group such as Rohm and Haas Duolite C-467™ (available from Rohm and Haas, Pittsburgh, Pa.), or Dow-X 650C™ or Dow-X XUS40406™ (available from Dow Chemical Company, Midland, Mich.).

A first clean ammonium fluosilicate solution stream 30 and a second clean ammonium fluosilicate solution stream 32 is drawn from ion exchange unit E. A "clean" ammonium fluosilicate solution is considered to have less than about 15 ppb of magnesium, less than about 8 ppb of calcium, less than about 3 ppb of iron, less than about 2 ppb of titanium and zinc, and less than about 1 ppb of cadmium, copper, nickel, vanadium, and yttrium. The first clean ammonium fluosilicate solution stream 30 is fed to a batch seed reactor H. A second clean ammonia stream 34 are also fed to the batch seed reactor H. The first clean ammonia stream 26 and the second clean ammonia stream 34 is provided from a vaporizer G. The vaporizer G receives impure ammonia stream 42 and separates the first clean ammonia stream 26, the second ammonia stream 34, and a third clean ammonia stream 38 from an ammonia impurities stream 44. A "clean" ammonia stream is considered to have less than about $4 \times 10^{-6}$ pounds of liquid entrainment per pound of total vapor.

The first clean ammonium fluosilicate stream 30 and the second clean ammonia stream 34 form a silica seed slurry 36 in the batch seed reactor H by the following reaction:

$$4NH_3 + 2H_2O + (NH_4)_2SiF_6 \rightarrow SiO_2 + 6NH_4F$$

The silica seed slurry 36 is fed to a continuous reactor F. The silica seed crystals in the silica seed slurry 36 are sized from about 5 to 50 microns (preferably about 15 to 30 microns) with a surface area from about 25 to 500 m²/g (preferably about 75 to 150 m²/g). The silica seed slurry 36 generally contains from about 2 to 6% (dry weight) of silica seed crystals (preferably about 3.5 to 4.5% dry weight silica).

The second clean ammonium fluosilicate solution stream 32 and the third clean ammonia stream 38 are aim fed to the continuous reactor F. The continuous reactor F produces a high purity silica/ammonium fluoride stream 40 by the same reaction as the batch seed reactor H.

The use of the batch seed reactor H is the preferred method to produce silica which fuses relatively bubble free after thermal treatment (fusible silica can also be produced from batch ammoniations). In a preferred embodiment, the batch seed reactor H consists of a tank of about 12% ammonium fluosilicate which is ammoniated batch-wise to a pH of about 8. The silica seed slurry 36 is fed continuously to the continuous reactor F which also receives the second clean ammonium fluosilicate solution stream 32 and the third clean ammonia stream 38. The batch seed reactor H operates at a pH of about 8.5 and a temperature of about 165° F. The volumetric ratio of the second clean ammonium fluosilicate solution stream 32 fed to the continuous reactor F to the silica seed slurry 36 fed to the continuous reactor F is approximately 3:1. This ratio varies slightly depending on the surface area supplied per time by the silica seed slurry 36. The silica seed crystals from the silica seed slurry 36 are generally preferred since spontaneous nucleation of new silica particles in the continuous reactor F at alkaline pH produces silica which does not fuse well after thermal treatment. Experimentation has indicated that the surface area supplied by the silica seed slurry 36 can be greatly affected by the ammoniation conditions of the batch. Such factors as temperature, ammoniation rate, and ammonium fluosilicate strength have a substantial impact on the size and specific surface area of the seed material. Ultimately, although the applicant does not fully understand all of the physical and chemical interactions, reactor product properties such as moisture content, fusibility, bulk density, particle size distribution, and specific surface area can be controlled by changing the conditions of both the batch seed reactor H and the continuous reactor F. Generally speaking, increasing ammoniation temperatures produce seed silica of larger size, greater bulk density, less moisture content, and lower specific surface area. Temperature effects appear to be the single most important factor with respect to silica properties. Ammonium fluosilicate does not appear to have a significant effect except at very low concentrations (less than about 2.5%) where particle size, specific surface area, and moisture content increases dramatically and bulk density decreases. An optimum ammoniation rate may exist for maximizing particle size.

Additionally, testing has been conducted on a pressurized continuous reactor which allows temperatures greater than 200° F. While product improvements may be minimal, such a process may produce significant environmental advantages in terms of scrubbers required since lower fluoride emissions emanate from scrubbing ammonia vapor with phosphoric acid.

It is, of course, understood that the absorber C and the mixer D could be replaced with a system which mixes high purity water with the cleaned silicon tetrafluoride gas stream 18 to form fluosilicic acid which can be purified through the ion exchange unit E and fed to continuous reactor F for ammoniation. This would also result in the production of high purity silica.

As discussed above, it was found that a major cause of contamination is iron. It has been discovered that iron contamination (1.5–5.0 ppm) was proportional to silica production (ammoniation) rate which indicated that the liquid ammonia entrainment from the vaporizer G was carrying iron into the continuous reactor F. The greater the production rate, the greater the quantity of contaminated liquid ammonia entrainment which entered the reactor.

It has been found that anhydrous ammonia is generally manufactured in mild steel compressors and is often contaminated with metal containing lubricants. Therefore, it is essential that ammonia droplets which carry the majority of the contaminants be removed from the vapor before entering either the continuous reactor F or the batch seed reactor H.

In one embodiment, the vaporizer G comprises a vertical, single pass, shell and tube exchanger with steam in the shell and ammonia in the tubes. A vapor drum is mounted above the exchanger and liquid level is maintained in the drum at all times. This design forces a liquid/vapor mixture to rise through a pool of liquid ammonia in the drum, thereby, minimizing liquid entrainment in the vapor stream leaving the vaporizer G. In a specific embodiment, vaporizer G is a flask drum with an 8 inch diameter Style 3260 FLEXIMESH® Mist Eliminator attached to the outlet of the drum to capture large droplets. The FLEXIMESH® Mist Eliminator is followed by a 12 inch diameter by 24 inch tall FLEXIFIBER® Mist Eliminator to capture nearly all of the remaining fine droplets and solid particles (similar to those found in absorbing towers in sulfuric acid plants). The collection efficiency of the system is essentially 100% of all particles greater than about 3 microns in diameter and 99.5+% of all particles less than three microns in diameter. The system is operated in the following ranges: gas flow rate of about 54–224 SCFM, gas temperature of about 32°–62° F., gas pressure of about 50–100 psig, gas density of about 0.2616 lbs/ft$^3$, and liquid density of about 48 lbs/ft$^3$. However, it is believed that a kettle-type reboiler could be used in lieu of the system described above. A kettle-type reboiler should have higher efficiency and reduce the loading on the demisters.

Referring again to FIG. 1, the high purity silica/ammonium fluoride stream 40 is fed to a perforated basket centrifuge I which removes a high purity silica stream 48 from the high purity ammonium fluoride stream 52. A first high purity water stream 46 is also introduced after the filtration in the centrifuge I to wash the high purity ammonium fluoride from the silica cake and is discarded as waste stream 50. In a preferred embodiment, perforated basket centrifuge I is a Sanborn 48"×30" perforated basket centrifuge with Halar coated basket and tub, hastelloy plow, and polypropylene filter media.

A potion of the high purity ammonium fluoride stream 52 is ultimately fed to the absorber C as the low N/F mole ratio 6% ammonium fluoride stream 24. However, the high purity ammonium fluoride stream 52 has an N/F mole ratio of greater than 1. Thus, the high purity ammonium fluoride stream 52 is fed to an evaporator J to reduce the N/F mole ratio to less than 1. The evaporator J receives the high purity ammonium fluoride stream 52 at about 16% ammonium fluoride with an N/F mole ratio between about 1.1 and 1.2 and produces 36% ammonium fluoride with an N/F mole ratio between 0.9 and 1.0. Approximately two-thirds of the resulting 36% ammonium fluoride is taken off as by-product stream 54. The remaining approximately one-third of the resulting 36% ammonium fluoride is removed as recycle stream 56 and mixed in vessel K with a second high purity water stream 58 to form the low N/F mole ratio 6% ammonium fluoride solution 24 which is sent to the absorber C, as discussed above.

The reduced mole ratio of the ammonium fluoride stream 24 fed to the absorber C is advantageous because it prevents premature precipitation of silica in the absorber C. Such precipitation can have adverse effects on the fusibility of the product silica if it is not removed prior to decomposition of the ammonium fluosilicate. Prematurely precipitated silica also hinders transport of the ammonium fluosilicate by causing damage and wear to pumps. The exact reasons why such premature or spontaneous silica precipitation results in a silica particle having less desirable characteristics are not fully understood.

In a preferred embodiment (not shown), the evaporator J is a shell with vertical, U-shaped tube bundle 2200 ft$^2$ constructed of Solef™ PVDF. The shell is PVDF lined, FRP dual-laminate construction. Steam at about 15 psig enters the tubes and ammonium fluoride enters the shell. Three thermosiphon legs, exterior to the evaporator J, recirculate ammonium fluoride through the tube bundle. A chevron-type demister pad prevents excessive loss of product in the overhead vapor stream. Overhead vapor exiting the demister passes through a venturi scrubber and separator vessel of dual-laminate construction which scrubs ammonia vapor into phosphoric acid. Water vapor (maximum rate approximately 4500 lbs/hr) then continues on to a direct contact (barometric pond water) condenser and non-condensables are vented through a two-stage steam jet system. This supplies vacuum to the whole unit which operates at about 60–90 mmHg absolute pressure and about 120°–160° F.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A method for producing high purity silica and ammonium fluoride from a phosphorus-containing source, said method comprising the steps of:
    (a) recovering silicon tetrafluoride-containing gas from the acidulation of a fluorine-containing phosphorus source;
    (b) separating liquid entrainment from the gas;
    (c) converting the gas recovered from step (b) to an ammonium fluosilicate solution;
    (d) separating impurities from the ammonium fluosilicate solution to form a cleaned ammonium fluosilicate solution; and
    (e) ammoniating said cleaned ammonium fluosilicate solution along with silica seed crystals to produce high purity silica and ammonium fluoride.

2. The method of claim 1 further comprising the step of elevating a pH of the ammonium fluosilicate solution with ammonia prior to separating impurities from the ammonium fluosilicate solution.

3. The method of claim 1 wherein the step of separating impurities from the ammonium fluosilicate solution comprises filtering the ammonium fluosilicate solution through an ion exchange unit.

4. The method of claim 1 wherein the recovery of the silicon tetrafluoride-containing gas is achieved using a stripper; said stripper comprising a vessel having a neck attached to and extending downward from said vessel wherein said neck receives said fluorine-containing phosphorus source and an acid stream; said vessel increases in diameter above said neck to reduce gas velocity; and said vessel includes a condenser for removing entrained liquid prior to the gas exiting said stripper.

5. The method of claim 1, wherein the step of converting the gas recovered from step (b) comprises contacting the gas with an ammonium fluoride solution with an N/F mole ratio of less than about 1.

6. A method for producing high purity silica and ammonium fluoride from a phosphorus-containing source, said method comprising:
    (a) recovering silicon tetrafluoride-containing gas from the acidulation of a fluorine-containing phosphorus source;
    (b) converting the gas recovered from step (a) to an ammonium fluosilicate solution;
    (c) separating impurities from the ammonium fluosilicate solution to form a cleaned ammonium fluosilicate solution; and
    (d) ammoniating said cleaned ammonium fluosilicate solution to produce high purity silica and ammonium fluoride.

7. The method of claim 6 wherein the step of separating impurities from the ammonium fluosilicate solution comprises filtering the ammonium fluosilicate solution through an ion exchange unit.

8. The method of claim 7 wherein the ion exchange unit contains an ion exchange media which removes contaminant cations from ammonium fluosilicate liquid and replaces said cations with protons.

9. The method of claim 8 wherein the ion exchange media comprises a gel or macroporous polystyrene divinylbenzene copolymer with an amino phosphonic functional group.

10. A method for producing high purity silica and ammonium fluoride from a phosphorus-containing source, said method comprising the steps of:
    (a) recovering silicon tetrafluoride-containing gas from the acidulation of a fluorine-containing phosphorus source;
    (b) converting the gas recovered from step (a) to an ammonium fluosilicate solution; and
    (c) ammoniating said ammonium fluosilicate solution along with silica seed crystals to produce high purity silica and ammonium fluoride.

11. A method for producing high purity silica and ammonium fluoride from a phosphorus-containing source, said method comprising the steps of:
    (a) recovering silicon tetrafluoride-containing gas from the acidulation of a fluorine-containing phosphorus source, wherein the recovery of the silicon tetrafluoride-containing gas is achieved using a stripper; said stripper comprising a vessel having a neck attached to and extending downward from said vessel wherein said neck receives said fluorine-containing phosphorus source and an acid stream; said vessel increases in diameter above said neck to reduce gas velocity; and said vessel includes a condenser for removing entrained liquid prior to the gas exiting said stripper;
    (b) converting the gas recovered from step (a) to an ammonium fluosilicate solution; and
    (c) ammoniating said ammonium fluosilicate solution to produce high purity silica and ammonium fluoride.

12. The method of claim 11 wherein each of said fluorine-containing phosphorus source and said acid stream are received by said neck below an operating liquid level in said neck.

13. The method of claim 12 wherein a steam stream is received by said neck below the operating liquid level in said neck.

14. A method for producing high purity silica and ammonium fluoride from a phosphorus-containing source, said method comprising the steps of:
    (a) recovering silicon tetrafluoride-containing gas from the acidulation of a fluorine-containing phosphorus source;
    (b) converting the gas recovered from step (a) to an ammonium fluosilicate solution wherein the conversion comprises contacting the gas with an ammonium fluoride solution with an N/F mole ratio of less than about 1; and
    (c) ammoniating said ammonium fluosilicate solution along with silica seed crystals to produce high purity silica and ammonium fluoride.

15. The method of claim 14, wherein the ammonium fluoride solution has an N/F mole ratio of between about 0.9 and 1.0.

16. The method of claim 14, wherein the ammonium fluoride solution is in a concentration of about 6% by weight.

* * * * *

UNITED STATES PATENT AND TRADEMARK OFFICE
CERTIFICATE OF CORRECTION

PATENT NO. : 5,679,315
DATED : October 21, 1997
INVENTOR(S) : Neuman et al.

It is certified that error appears in the above-identified patent and that said Letters Patent is hereby corrected as shown below:

In column 1, line 60, change "free" to --fine--

In column 4, line 8, after "thereby" delete --,-- (comma)

In column 5, line 16, change "convened" to --converted--

In column 5, line 22, change "surf uric" to --sulfuric--

In column 6, line 27, change "falter" to --filter--

In column 7, line 29, change "are" to --is--

In column 7, line 31, change "is" to --are--

In column 7, line 56, change "aim" to --also--

In column 9, line 1, after "thereby" delete --,-- (comma)

Signed and Sealed this

Tenth Day of November 1998

Attest:

BRUCE LEHMAN

*Attesting Officer*          *Commissioner of Patents and Trademarks*